United States Patent [19]

McMahan et al.

[11] Patent Number: 5,038,563

[45] Date of Patent: Aug. 13, 1991

[54] SEAWATER POWER SOURCE FOR SEAWATER POWERED TOOLS

[75] Inventors: Gene McMahan, Ventura; Bruce Farber; Thomas Conley, both of Oakview, all of Calif.

[73] Assignee: The United States of America as represented by the Secretary of the Navy, Washington, D.C.

[21] Appl. No.: 564,893

[22] Filed: Aug. 7, 1990

[51] Int. Cl.[5] .......... F16D 31/02

[52] U.S. Cl. .......... 60/413; 60/325; 60/698; 60/453; 60/454; 60/484; 137/355.26; 137/899.4

[58] Field of Search .......... 60/413, 325, 453, 456, 60/484, 420, 454, 698; 405/186; 166/65.1; 137/355.16, 355.26, 899.4; 184/552; 417/244, 251

[56] References Cited

U.S. PATENT DOCUMENTS

| | | | |
|---|---|---|---|
| 1,482,376 | 2/1924 | Anderson | 137/568 |
| 1,968,308 | 7/1934 | Morley | 137/355.26 |
| 2,747,598 | 5/1956 | Wooldridge | 137/108 |
| 2,812,895 | 11/1957 | Peeps | 137/899.4 |
| 3,389,801 | 6/1968 | Sieger | 210/135 |
| 3,820,559 | 6/1974 | Griffiths et al. | 137/3;55.16 |
| 3,880,250 | 4/1975 | Emanuele | 60/413 |
| 3,906,726 | 9/1975 | Jameson | 60/413 |
| 3,939,862 | 2/1976 | Booth | 137/355.16 |
| 3,986,564 | 10/1976 | Bender | 60/484 |
| 3,996,136 | 12/1976 | Jakubek et al. | 210/86 |
| 4,208,152 | 6/1980 | Colston | 405/186 |
| 4,311,165 | 1/1982 | Rose | 137/355.26 |
| 4,348,863 | 9/1982 | Taylor et al. | 60/413 |
| 4,498,606 | 2/1985 | DiRenzo | 137/355.16 |
| 4,660,588 | 4/1987 | Skraba | 137/8 |
| 4,754,603 | 7/1988 | Rosmon | 60/413 |
| 4,807,721 | 2/1989 | Fujiwara | 184/55.2 |
| 4,830,056 | 5/1989 | Chamberlain | 137/899.4 |
| 4,953,295 | 9/1990 | Barradas et al. | 30/380 |
| 4,955,195 | 9/1990 | Jones et al. | 60/413 |
| 4,977,966 | 12/1990 | Farber et al. | 173/159 |

FOREIGN PATENT DOCUMENTS

| | | | |
|---|---|---|---|
| 2751663 | 5/1978 | Fed. Rep. of Germany | 60/431 |

*Primary Examiner*—Edward K. Look
*Assistant Examiner*—Todd Mattingly
*Attorney, Agent, or Firm*—David S. Kalmbaugh

[57] ABSTRACT

A seawater power source for providing pressurized seawater to hydraulic tools which utilize the pressurized seawater as their operating fluid. Included in the present invention is a diesel engine for driving a source of compressed air which, in turn, drives a first pump for withdrawing seawater from the ocean and transferring the seawater to a reservoir, and a second pump driven by the diesel engine for withdrawing seawater from the reservoir, pressurizing the seawater and supplying the pressurized seawater to the hydraulic tools. The present invention also includes a unique hose reel which facilitates the changing of tools by allowing an operator to change pressure and fluid flow rate while the seawater power source is operational.

6 Claims, 2 Drawing Sheets

SEAWATER POWER SOURCE FOR SEAWATER POWERED TOOLS

BACKGROUND OF THE INVENTION

1. Field of the Invention

This invention relates generally to hydraulic power tools. In particular, this invention relates to a seawater power source for providing pressurized seawater to hydraulic power tools which use the pressurized seawater as an operating fluid.

2. Description of the Prior Art

Conventional underwater tools are underwater pneumatic tools, underwater oil hydraulic tools and underwater electric tools which respectively utilize pressurized air, pressurized oil and electric power for motive power. Such conventional underwater tools have certain disadvantages.

In the underwater pneumatic tools, the air is usually exhausted into the surrounding water so that the depth at which the underwater pneumatic tool can be used is limited due to back pressure on the discharged air. Moreover, large quantities of bubbles are generated so that visibility in the water is disturbed and in some cases, the use of acoustic communication through the water is disturbed.

The use of oil driven hydraulic tools underwater creates serious logistics problems in that large quantities of oil have to be shipped and stored at sea. There is also a need for supply and return hoses from a surface ship limiting the diver's ability to handle the hydraulic tool, particularly where surge and strong currents exist. Further, leakage of the oil fluid from the tool would contaminate the environment.

In underwater electric tools, electrical leakage into the water can occur so that it is dangerous for the diver to operate the tool underwater.

Another alternative would be to design hydraulic tools which utilizes pressurized seawater as the operating fluid. The design of tools which utilizes seawater as the hydraulic fluid presents a serious challenge to the designer because of the general corrosiveness of seawater on precision made parts in such tools. The poor lubricity of seawater and much lower viscosity for seawater than for conventional oil hydraulic fluid contributes to the problem of designing efficient seawater operated hydraulic tools. The design of pressurized seawater powered tools presents an additional challenge to the designer in that such tools must have a reliable power source to provide the pressurized seawater necessary for the efficient operation of these tools.

With the disadvantages inherent in the design of oil operated tools, air operated tools and electrically powered tools when utilized in an underwater environment, the present invention was conceived and one of its objectives is to provide an efficient power source for use with seawater powered tools such as the seawater hydraulic bandsaw disclosed in U.S. patent application Ser. No. 479,490 by Scott Barradas, Bruce Farber, and William B. Luther, filed Feb. 2, 1990.

It is another object of the present invention to provide a source of power for tools which utilizes seawater as the hydraulic fluid so as not to contaminate the environment.

Various other advantages and objectives of the present invention will become apparent to those skilled in the art as a more detailed description of the invention is set forth below.

SUMMARY OF THE INVENTION

The subject invention overcomes some of the disadvantages of the prior art, including those mentioned above in that it comprises an efficient yet relatively simple seawater power source for providing pressurized seawater to hydraulic tools which utilize the pressurized seawater as their operating fluid. Included in the present invention is a diesel engine for driving a source of compressed air which, in turn, drives a first pump for withdrawing seawater from the ocean and transferring the seawater to a reservoir, and a second pump driven by the diesel engine for withdrawing seawater from the reservoir, pressurizing the seawater and supplying the pressurized seawater to the hydraulic tools. The present invention also includes a unique hose reel which facilitates the changing of tools by allowing an operator to change pressure and fluid flow rate while the seawater power source is operational.

DESCRIPTION OF THE PREFERRED EMBODIMENT

The preferred embodiment of the subject invention will now be discussed in some detail in conjunction with all of the figures of the drawings.

Figure 1:
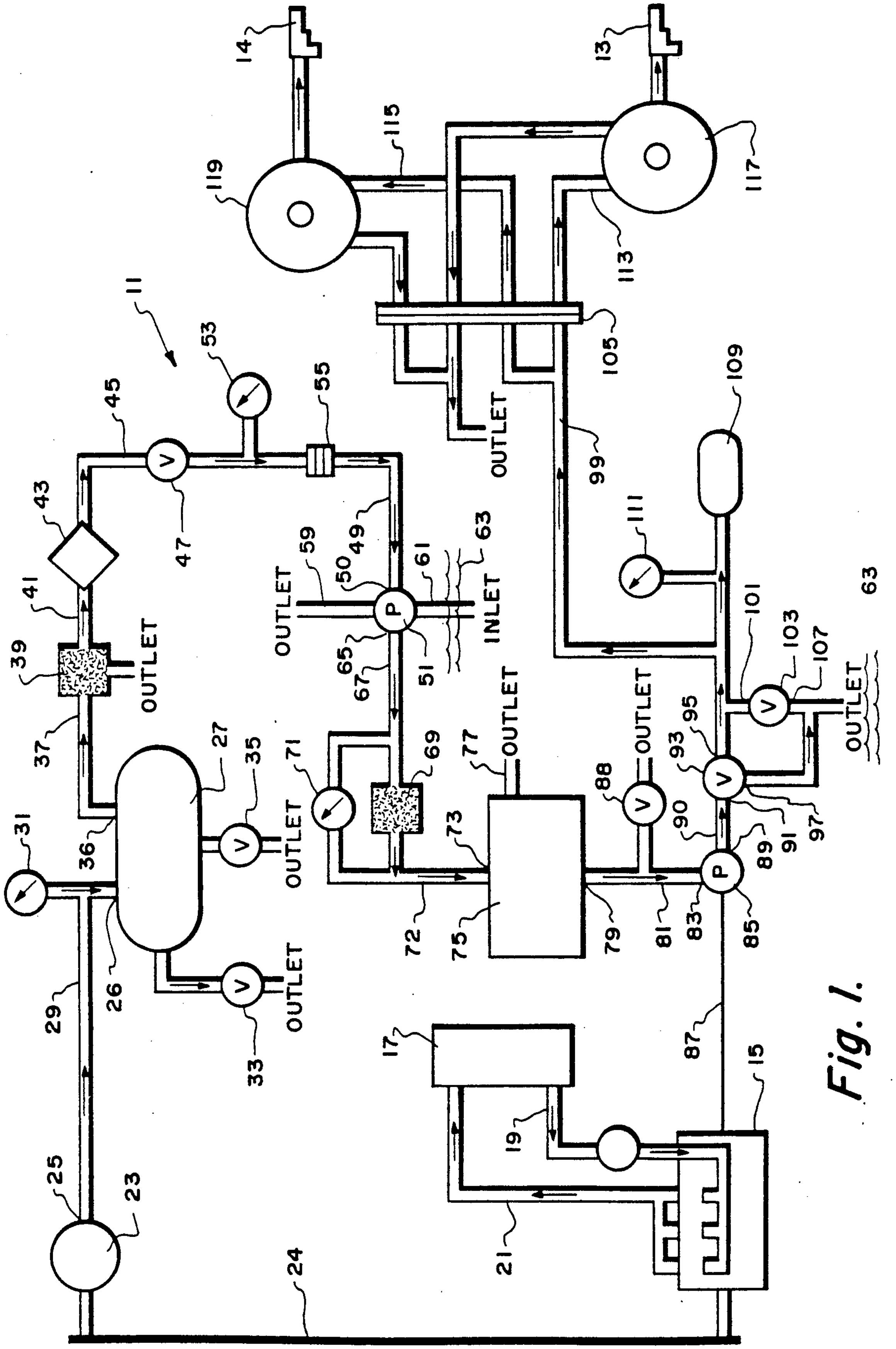
FIG. 1 is schematic diagram illustrating the components of the seawater power source constituting the present invention.

Referring now to FIG. 1, there is shown a seawater power source 11 which provides pressurized seawater to hydraulic power tools which use the pressurized seawater as the operating fluid. Power source 11 comprises a diesel engine 15 which has a fuel tank 17 for providing diesel fuel through a line 19 to engine 15 to allow diesel engine 15 to operate. Excess fuel not used by diesel engine 15 during operation is returned to fuel tank 17 through a line 21.

Diesel engine 15 is connected to an air compressor 23 by a drive belt 24 with diesel engine 15 driving air compressor 23 such that air compressor 23 provides at the output port 25 thereof air pressure at approximately 120 psi. The output port 25 of air compressor 23 is connected to the inlet port 26 of an air storage tank 27 by a line 29. Air storage tank 27 has on the inlet port 26 thereof a pressure gauge 31 for monitoring air pressure within tank 27, a safety relief valve 33 which opens whenever the air pressure within tank 27 exceeds 120 psi, and a drain valve 35 for draining moisture from tank 27 which accumulates at the bottom of tank 27 during the operation of power source 11.

The outlet port 36 of tank 27 is connected through a line 37 to a filter/water separator 39 containing a filter of appropriate size to remove solids from the compressed air and a water separator to remove any remaining moisture from the compressed air. Filter/water separator 39 is connected through a line 41 to a lubricator 43 which adds droplets of a light weight oil to the pressurized air flowing through lubricator 43. Lubricator 43 is connected through a line 45 to a manually adjustable pressure regulator valve 47 which during the operation of seawater power source 11 is normally set between 20 psi and 90 psi.

It should be noted that the diesel engine 15 used in the preferred embodiment of the present invention is a Lombardini Model 5LD825-3 diesel engine, the filter 39 is a Model 3531-1000 filter/water separator manufactured by the Schrader Bellows Div. of Scovill Inc. and the lubricator 43 is a Model 3581-1000 lubricator manufactured by Schrader Bellows.

Pressure regulator valve 47 is connected through a line 49 to the air supply inlet port 50 of an air operated water pump 51. Line 49 includes a pressure gauge 53 for monitoring the air pressure within line 49 and a quick disconnect panel 55. Quick disconnect panel 55 allows line 49 to be disconnected from the air supply inlet 50 of pump 51 which, in turn, allows an operator to connect line 49 to an air operated tool, not shown, which uses compressed air as the operating fluid.

Pump 51 has an air exhaust outlet port 59 for exhausting compressed air used to drive pump 51 into the atmosphere; a seawater inlet port 61 through which seawater is drawn from the ocean 63 and a seawater outlet port 65 connected through a line 67 to a filter 69 which has a pressure gauge 71.

Pump 51 moves the seawater from the ocean 63 through line 67 to filter 69 which removes large particles/solids such as dirt from the seawater. Filter 69 may be a basket type filter manufactured by Ronningen-Petter which uses a reusable fabric bag as the filtering means. Pressure gauge 71 provides a pressure differential measurement between the inlet port and the outlet port of filter 69 with the measurement indicating the amount of dirt or other solids trapped by filter 69. When the pressure differential measured by pressure gauge 71 exceeds approximately 4 psi, an operator needs to remove and clean the basket filter within filter 69 to allow for the efficient operation of seawater power source 11.

It should be noted that depending upon the head that pump 51 must generate to draw seawater from the ocean 63, the air pressure to the air supply inlet 50 of pump 51 may be varied manually by regulator 47. The pump utilized in the preferred embodiment of the present invention is a model M-2 pump manufactured by Wilden Pump and Engineering Co. which has a suction lift capability of up to 25 feet for liquids.

The filter 69 is connected by a line 72 to the inlet port 73 of a reservoir 75 which includes an overflow line 77 for dumping excess seawater into the ocean 63. The outlet port 79 of reservoir 75 is connected by a line 81 to the inlet port 83 of a high pressure water pump 85 which provides at the outlet port 89 thereof seawater pressurized at about 2000 psi and having a flow rate of approximately 14 gallons per minute. The high pressure pump utilized in the preferred embodiment of the present invention is a series "P" 8 cylinder pump manufactured by Harben Inc. Pump 85 is driven by diesel engine 15 which has a drive shaft 87 coupled directly to pump 85. To allow for drainage of reservoir 75 when power source 11 is non-operational, line 81 includes a drain valve 88.

The outlet port 89 of pump 85 is connected by a line 90 to the inlet port 91 of a manually operated diverter valve 93 which has a pair of outlet ports 95 and 97 with port 95 being connected by a line 99 to the inlet port 101 of a manually adjustable pressure relief valve 103 and a disconnect panel 105, while outlet port 97 is connected with the outlet port 107 of relief valve 103 to dump excess seawater into the ocean 63. An accumulator 109 and pressure gauge 111 are also connected to line 99 between outlet port 95 and disconnect panel 105. Disconnect panel 105 has a pair of lines 113 and 115 extending therefrom and respectively connected to a pair of identical hose reels 117 and 119 which are, in turn, respectively connected to the inlet ports of tools 13 and 14.

When seawater power source 11 is operational, pressure relief valve 103 regulates the pressure at which seawater is supplied to hose reels 117 and 119. During the operation of power source 11 pressure relief valve 103 is set approximately 200 psi above the recommended operating pressure for seawater powered tool 13 to compensate for any loss of water pressure between the outlet port 89 of pump 85 and hose reels 117 and 119. Thus, if tool 13 operates at a pressure of approximately 1500 psi, pressure regulator 103 is set at approximately 1700 psi. Accumulator 109 functions as a pulsation dampener removing pressure spikes from the pressurized seawater caused by the operation of pump 85. The accumulator 109 may be a nitrogen charged accumulator similar to the Giant Model 22050 accumulator used with the present invention. Pressure gauge 111 allows an operator to monitor the pressure of the seawater supplied through line 99 to hose reels 117 and 119.

By manually adjusting diverter valve 93 such that seawater flows through outlet port 97 of valve 93 into the ocean 63, an operator may disconnect lines 113 and 115 from panel 105 to facilitate the changing of hose reels 117 and 119 while power source 11 is operational.

Figure 2:
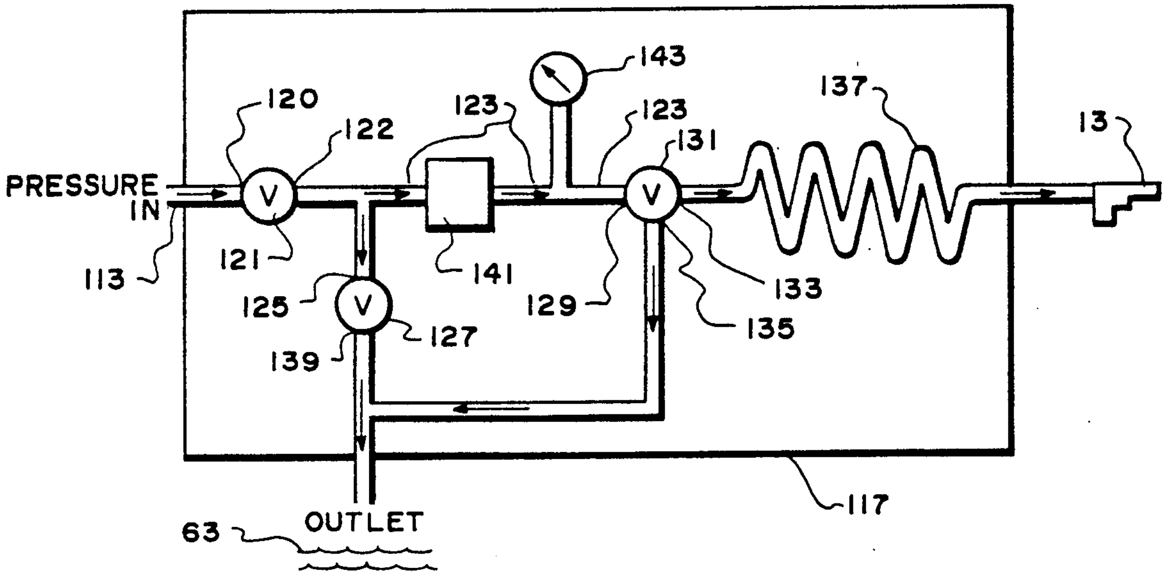
FIG. 2 is a detailed schematic diagram of a hose reel of the present invention.

Referring now to FIGS. 1 and 2, line 113 connects disconnect panel 105 to the inlet port 120 of a pressure compensated flow control valve 121 which regulates the fluid flow rate to tool 13 to the operating fluid flow rate for tool 13. The outlet port 122 of valve 121 is connected by a line 123 to the inlet port 125 of a manually adjustable pressure relief valve 127, which regulates the pressure of the seawater flowing to tool 13 to the operating pressure for tool 13. Line 123 also connects the outlet port 122 of valve 121 to the inlet port 129 of a manually operated diverter valve 131 which has a pair of outlet ports 133 and 135 with outlet port 133 being connected to a hose 137 mounted on a reel, not shown, and outlet port 135 being connected with the outlet port 139 of pressure relief valve 127 to dump excess seawater into the ocean 63. Line 123 also includes a flow rate meter 141 for monitoring fluid flow rate through line 123 and pressure gauge 143 for monitoring the pressure within line 123. The thermoplastic hose 137 used in the present invention has a length of 250 feet which would allow a diver utilizing tool 13 to descend to depths of up to 250 feet. It is to be understood that seawater powered tools of the type described in U.S. patent application Ser. No. 479,490 are not depth limited except by the capabilities of the pump 85. Accordingly, a hose of length greater than 250 feet may be used with the present invention.

To facilitate changing of a tool while seawater power source 11 is operational, an operator may divert the flow of seawater through outlet port 135 of diverter valve 131. This allows the operator to change either tool 13 or tool 14 while the other tool is operational, adjust the pressure and rate of fluid flow to the tool by respectively adjusting valves 127 and 121 and monitor the rate of fluid flow and pressure by respectively reading flow rate meter 141 and pressure gauge 143.

From the foregoing, it may be seen that the subject invention comprises a new, unique and exceedingly useful seawater power source. Obviously, many modifications and variations of the present invention are possible in light of the above teachings. It is, therefore, to be understood that within the scope of the appended claims the invention may be practiced otherwise than as specifically described.

What is claimed is:

1. A seawater power source for providing pressurized seawater to a hydraulic tool to be utilized below the ocean's surface and having an inlet port, said seawater power source comprising:

means having an outlet port for providing a pressurized gas;

means having an inlet port connected to the outlet port of said gas providing means and an outlet port for storing said pressurized gas, for preventing said pressurized gas from exceeding a predetermined pressure and for removing moisture from said pressurized gas;

first filtration means communicating with said storage means through the outlet port thereof for removing solids from said pressurized gas and for removing any remaining moisture from said pressurized gas;

first pumping means having an inlet port and an outlet port, said inlet port communicating with said first filtration means, said first pumping means being adapted to withdraw seawater from the ocean and to transfer seawater to a reservoir, said first pumping means being driven by said pressurized gas;

said reservoir having an inlet port connected to the outlet port of said first pumping means and an outlet port;

first valve means for regulating the pressure of said gas between a predetermined upper and lower pressure limit when said gas is moving from said storage means to said first pumping means;

second pumping means having an inlet port connected to the outlet port of said reservoir and an outlet port, said second pumping means being adapted to withdraw the seawater from said reservoir and to pressurized the seawater to a predetermined pressure and a predetermined flow rate;

second valve means having an inlet port connected to the outlet port of said second pumping means and an outlet port, said second valve means being adapted to maintain the pressure of said seawater at a predetermined level above the operating pressure of said hydraulic tool;

accumulator means connected to the outlet port of said second pumping means for removing pressure spikes from the pressurized seawater provided by said second pumping means; and means connected between the outlet port of said second pumping means and the inlet port of said hydraulic tool for regulating the pressure and the flow rate of the seawater supplied to said hydraulic tool to the operating pressure and flow rate of said hydraulic tool and for allowing a diver utilizing said hydraulic tool to descend to a predetermined depth below the ocean's surface.

2. The seawater power source of claim 1 wherein said means for regulating the pressure and the flow rate of the seawater supplied to said hydraulic tool to the operating pressure and flow rate of said hydraulic tool comprises:

a pressure compensated flow control valve having an inlet port connected to the outlet port of said second pumping means and an outlet port;

a manually adjustable pressure relief valve having an inlet port connected to the outlet port of said pressure compensated flow control valve and an outlet port;

a manually operated diverter valve having an inlet port connected to the outlet port of said pressure compensated flow control valve, a first outlet port connected to the outlet port of said manually adjustable pressure relief valve and a second outlet port; and a hose connected to the second outlet port of said manually operated diverter valve.

3. The seawater power source of claim 2 further characterized by a flow rate meter and pressure gauge connected between the outlet port of said pressure compensated flow control valve and the inlet port of said manually operated diverter valve.

4. A seawater power source for providing pressurized seawater to a seawater hydraulic tool having an inlet port, said seawater power source comprising:

a diesel engine having a drive shaft;

an air compressor having an outlet port, said air compressor being connected to said diesel engine by a drive belt;

an air storage tank having an inlet port connected to the outlet port of said air compressor and an outlet port;

a first manually adjustable pressure relief valve having an inlet port connected to the outlet port of said air storage tank and an outlet port;

a first pump having an air supply inlet port connected to the outlet port of said first manually adjustable pressure relief valve and a seawater outlet port;

a filter/water separator connected between the inlet port of said first manually adjustable pressure relief valve and the outlet port of said air storage tank;

a lubricator connected between the inlet port of said first manually adjustable pressure relief valve and the outlet port of said air storage tank;

a reservoir having an inlet port connected to the seawater outlet port of said first pump and an outlet port;

a filter connected between the seawater outlet port of said first pump and the inlet port of said reservoir;

a second pump having an inlet port connected to the outlet port of said reservoir and an outlet port, said pump being coupled to the drive shaft of said diesel engine;

a manually operated diverter valve having an inlet port connected to the outlet port of said second pump and first and second outlet ports;

a second manually adjustable pressure relief valve having an inlet port connected to the first outlet port of said diverter valve and an outlet port connected to the second outlet port of said diverter valve;

an accumulator connected to the first outlet port of said manually operated diverter valve; and a hose reel connected between the first outlet port of said diverter valve and the inlet port of said seawater hydraulic tool.

5. The seawater power source of claim 4 wherein said hose reel comprises:

a pressure compensated flow control valve having an inlet port connected to the outlet port of said manually operated diverter valve and an outlet port;

a manually adjustable pressure relief valve having an inlet port connected to the outlet port of said pressure compensated flow control valve and an outlet port;

a manually operated diverter valve having an inlet port connected to the outlet port of said pressure compensated flow control valve, a first outlet port connected to the outlet port of said manually adjustable pressure relief valve and a second outlet port; and a hose connected to the second outlet port of said manually operated diverter valve.

6. The seawater power source of claim 5 further characterized by a flow rate meter and pressure gauge connected between the outlet port of said pressure compensated flow control valve and the inlet port of said manually operated diverter valve.

* * * * *